United States Patent [19]
Horikawa et al.

[11] Patent Number: 6,100,902
[45] Date of Patent: *Aug. 8, 2000

[54] IMAGE DATA APPROXIMATION CONSIDERING NORMAL VECTORS

[75] Inventors: Junji Horikawa, Tokyo; Takashi Totsuka, Chiba, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,247

[22] Filed: Oct. 28, 1997

[30] Foreign Application Priority Data

Oct. 31, 1996 [JP] Japan ................. P08-290554

[51] Int. Cl.[7] .................................. G06T 17/00
[52] U.S. Cl. .................. 345/441; 345/135; 345/136; 345/428
[58] Field of Search ................... 345/441, 135, 345/136, 428

[56] References Cited

U.S. PATENT DOCUMENTS

| | | | |
|---|---|---|---|
| 4,152,766 | 5/1979 | Osofsky et al. | 364/515 |
| 4,600,919 | 7/1986 | Stern | 340/725 |
| 4,694,407 | 9/1987 | Ogden | 364/518 |
| 4,783,829 | 11/1988 | Miyakawa et al. | 382/22 |
| 4,969,204 | 11/1990 | Melnychuck et al. | 382/56 |
| 5,029,228 | 7/1991 | Nonoyama et al. | 382/56 |
| 5,040,130 | 8/1991 | Chang et al. | 364/521 |
| 5,276,786 | 1/1994 | Long et al. | 395/128 |
| 5,323,326 | 6/1994 | Saito et al. | 364/474.24 |
| 5,341,466 | 8/1994 | Perlin et al. | 395/139 |
| 5,373,375 | 12/1994 | Weldy | 358/523 |
| 5,384,904 | 1/1995 | Sprague et al. | 395/139 |
| 5,448,686 | 9/1995 | Borrel et al. | 395/128 |
| 5,490,239 | 2/1996 | Myers | 395/129 |
| 5,504,847 | 4/1996 | Kimura et al. | 345/433 |
| 5,506,947 | 4/1996 | Taubin | 345/441 |
| 5,579,464 | 11/1996 | Saito et al. | 345/441 |
| 5,590,248 | 12/1996 | Zarge et al. | 382/128 |
| 5,613,051 | 3/1997 | Iodice et al. | 395/128 |
| 5,615,317 | 3/1997 | Freitag | 395/119 |
| 5,621,827 | 4/1997 | Uchiyama et al. | 382/307 |
| 5,689,577 | 11/1997 | Arata | 345/421 |
| 5,761,332 | 6/1998 | Wischmann et al. | 382/131 |
| 5,774,130 | 6/1998 | Horikawa et al. | 345/441 |
| 5,796,400 | 8/1998 | Atkinson et al. | 345/441 |
| 5,898,793 | 4/1999 | Karron et al. | 382/131 |
| 5,929,860 | 7/1999 | Hoppe . | |

OTHER PUBLICATIONS

G. Turk, "Re–Tiling Polygonal Surfaces," SISGRAPH '92, Computer Graphics Conference Proceedings, Jul. 26–31, 1992, pp. 55–64.

H. Hoppe et al., "Mesh Optimization," SISGRAPH '93, Computer Graphics Conference Proceedings, Aug. 1–6, 1993, pp. 19–26.

F. Schmitt et al., "An Adaptive Subdivision Method for Surface–Fitting From Sampled Data," Computer Graphics, vol. 20, No. 4, Aug. 18–22, 1996.

M. Garland et al., "Surface Simplification Using Quadric Error Metrics," Computer Graphics Proceedings, Annual Conference Series, Aug. 3–8, 1997, pp. 209–216.

Application No. 08/755,129 Nov. 25, 1996.
Application No. 08/987,004 Dec. 8, 1997.
Application No. 09/326,841 Jun. 7, 1999.

Primary Examiner—Mark R. Powell
Assistant Examiner—Albert K. Lee
Attorney, Agent, or Firm—Limbach & Limbach L.L.P.

[57] ABSTRACT

Distortion of normal vectors when approximating shape data with normal vectors is restrained. At step ST1, original polygon date is input. At step ST2, each edge is evaluated for performing removal of an edge. At step ST3, the evaluation values are sorted by magnitude and the edge having the minimum value is selected. At step ST4, the edge having the minimum evaluation value selected at step ST3 is removed. At step ST5, the position of vertices remaining after removal of the edge is decided. At step ST6, a normal vector which has become unnecessary on removal of the edge is removed and the remaining normal vectors are changed. At step ST7, an approximated model is drawn. The processing from steps ST2 to ST6 is repeatedly executed in accordance with a desired precision.

92 Claims, 12 Drawing Sheets

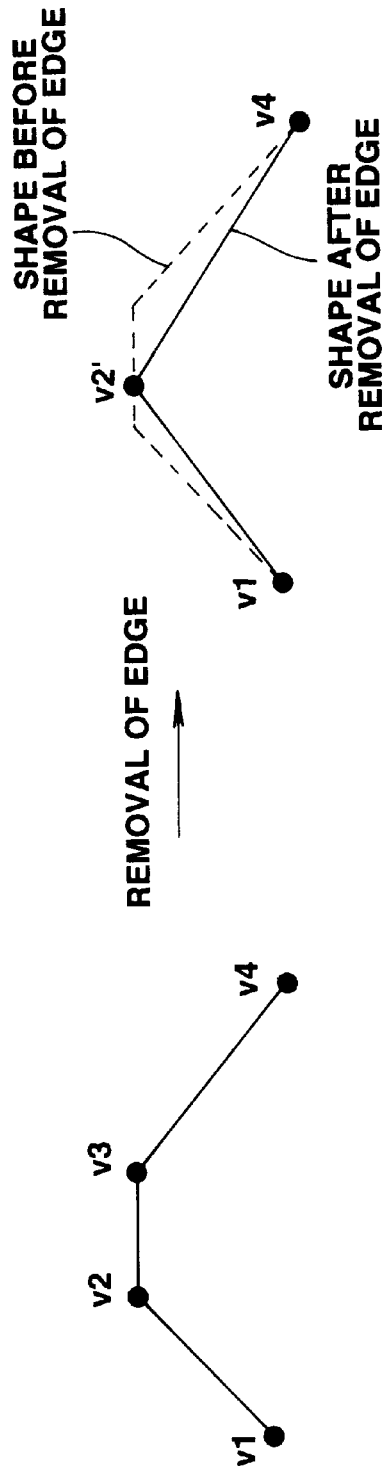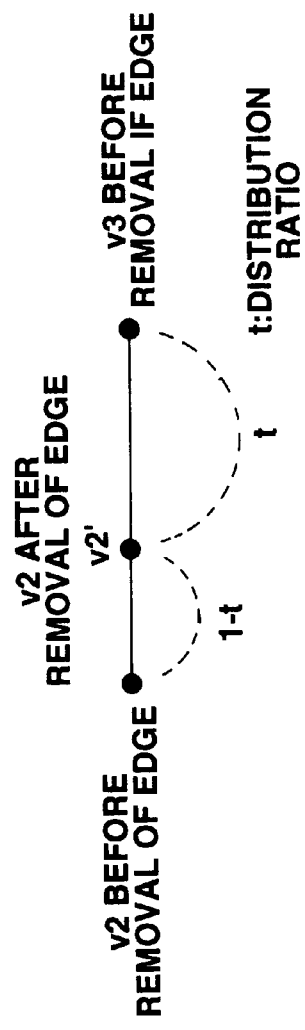
FIG.6A
FIG.6B
FIG.6C

ORIGINAL v1~v4: VERTEX
vn1~vn4: NORMAL VECTOR v1~v4: VERTEX
vn1~vn4: NOMAL VECTOR

CASE WHERE NORMAL VECTOR IS NOT CHANGED

BEFORE REMOVAL OF EDGE

AFTER REMOVAL OF EDGE    v1~v10: VERTEX

ORIGINAL: 762 VERTICES

60%: 457 VERTICES

36%: 274 VERTICES 21.6%: 164 VERTICES

IMAGE DATA APPROXIMATION CONSIDERING NORMAL VECTORS

BACKGROUND OF THE INVENTION

1. Field of the Invention

This invention relates to an approximation method for shape data, particularly with normal vectors and a drawing device which are adapted for reducing the complexity of the shape, and with respect to shape data with normal vectors expressing a geometric model used in computer graphics (CG).

2. Description of the Related Art

In drawing by computer graphics (CG), in general, a same model is constantly used regardless of the position, size and depth of the model, the point of a viewer's attention, and the shifting speed of the model.

However, the same model is not always required for drawing. By switching the model in accordance with the position, size and depth of the model within a screen, the point of the viewer's attention, and the shifting speed of the model, and using a more simplified model as well as an original detailed model, sufficient picture quality may be obtained.

For example, if a model is located at a distant position, the size of the model on the screen is so small that minute uneven changes of the original model are not seen. Also, with respect to a model located outside of the viewpoint of the viewer, detailed portions need not be seen. In addition, if the mode shifts within the screen at a high speed or if no attention should be paid to the model, detailed portions of the model need not be seen, either.

That is, in such cases, it is not necessary to perform drawing by using the detailed original model. It suffices to use an approximated model from which detailed portions of the original model have been removed.

With a model as a drawing target, a normal is allocated to each surface and vertex, and drawing is performed based on the assumption that a light is radiated to the model. In this way, the quality of drawing results is generally improved. This technique produces results similar to those in the case where a light is actually radiated to the model, by calculating reflectance and refraction in the case where the light is radiated.

Therefore, in performing shape approximation as described above, it is necessary to pay attention to the normals allocated to the surfaces and vertices of the model. There should not be any inconvenience, such as, increase in the entire operation quantity as a result of preventing deterioration in appearance of the model due to an erroneous direction or value of the normal at the time of approximation, or as a result of duplicate operations for re-allocating the normal to the approximated model.

Meanwhile, with respect to shape approximation, a trial of hierarchical approximation of a polygon model is described, for example, in the literature "Re-tiling polygonal surface" (computer graphics, Vol. 26, No. 2, July 1992) by Greg Turk. In this literature, however, the normal allocated to each vertex and surface of the model is not considered. In "Mesh Optimization" (Computer Graphics Proceedings, Annual Conference Series, SIGGRAPH 1993) by Hugues Hoppe, et al., energy is introduced in evaluation of an approximated model, and the model is approximated by repeating removal of an edge, division of a patch and swapping of the edge so that the energy is minimized. However, the normal vector at the time of approximation is not considered in this technique, either. Therefore, duplicate processing for providing normal vectors to an approximated model after the approximation of the model is required.

As described above, the past studies have some problems in model approximation.

Specifically, in the conventional approximation technique for geometric models used for CG, deterioration in quality after approximation has not been prevented by processing, such as, removal of the normal allocated to the model or change of value of the normal. Also, no particular measures have been taken to eliminate the necessity of re-allocating the normal after approximation. Approximation in consideration of the normal vectors themselves has not been done.

In view of the foregoing status of the art, it is an object of the present invention to provide a shape data approximation method and a drawing device which enable approximation of a geometric model used for CG in a state that normal vectors are appended, and which enable prevention of distortion of the normal vectors in approximation results.

SUMMARY OF THE INVENTION

According to the present invention, in approximating shape data with normal vectors appended thereto to desired resolution, which edge of the shape data to be removed is decided and the amount of shift of vertices after removal of the edge or new vertex positions are decided. In response to an output obtained from the edge removal decision and the vertex shift decision, normal vector values are changed in conformity with removal of an unnecessary normal and the new vertex positions of the shape data, with respect to the normal vectors allocated to the respective surfaces of the shape data.

According to the present invention, in order to obtain a model with normal vectors having a desired degree of detail, removal of an edge in model approximation is decided and the amount of shift of the vertices remaining after removal of the edge is decided. In response to the output obtained from the edge removal decision and the vertex shift decision, the removal and shift of the normal vectors allocated to the model surfaces are decided. In accordance with this decision, removal of the normal vector or change of value is carried out. Through these procedures, distortion of the normal vectors in model approximation is restrained so that approximation of a model including a picture is enabled.

BRIEF DESCRIPTION OF THE DRAWINGS

FIGS. 6A to 6C illustrate a vertex position decision after removal of the edge.

DETAILED DESCRIPTION OF THE INVENTION

A preferred embodiment of the approximation method and device for shape data with normal vectors according to the present invention will now be described in detail with reference to the drawings.

Figure 1:
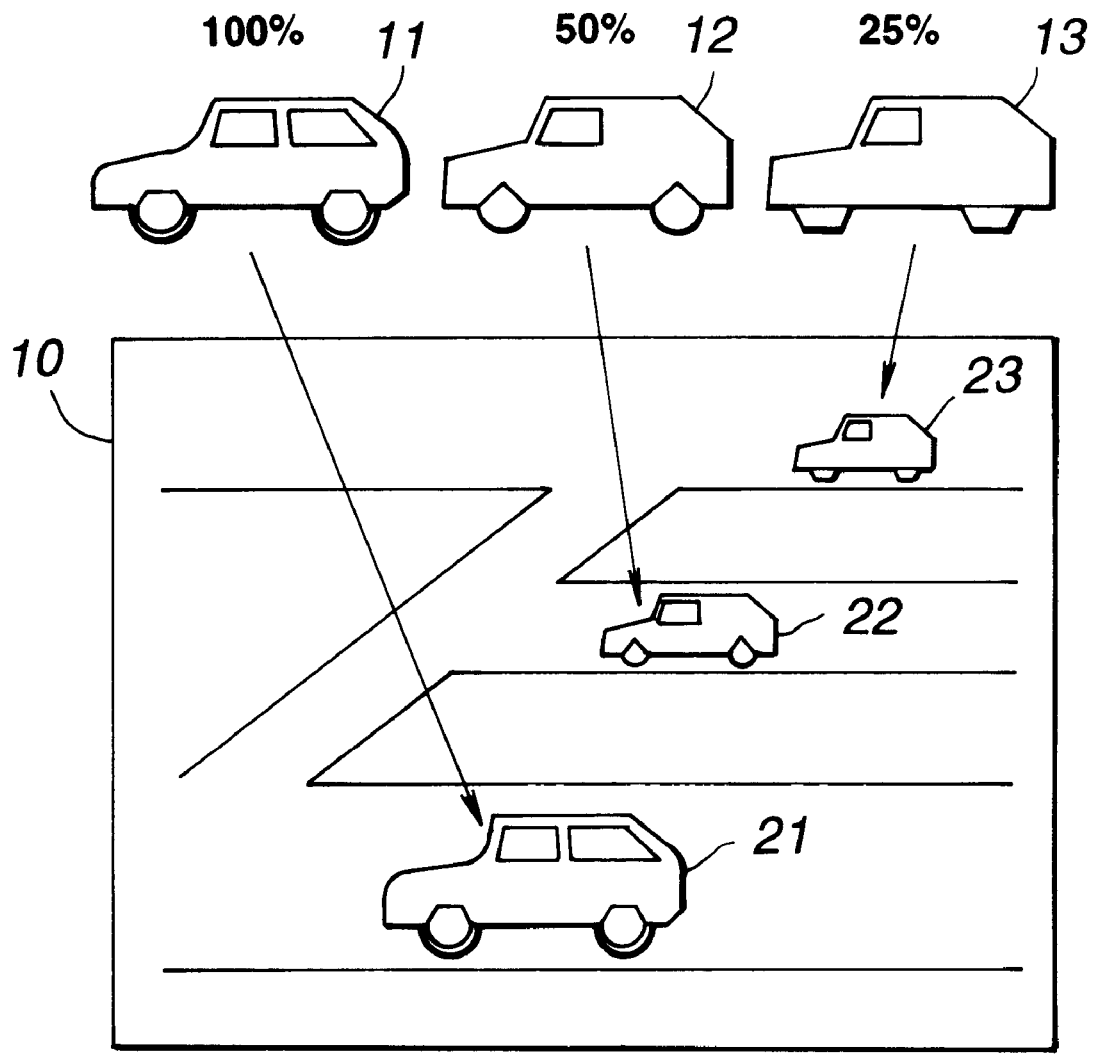
FIG. 1 illustrates approximated shape data and an exemplary display thereof according to an embodiment of the present invention.
Figure 2:
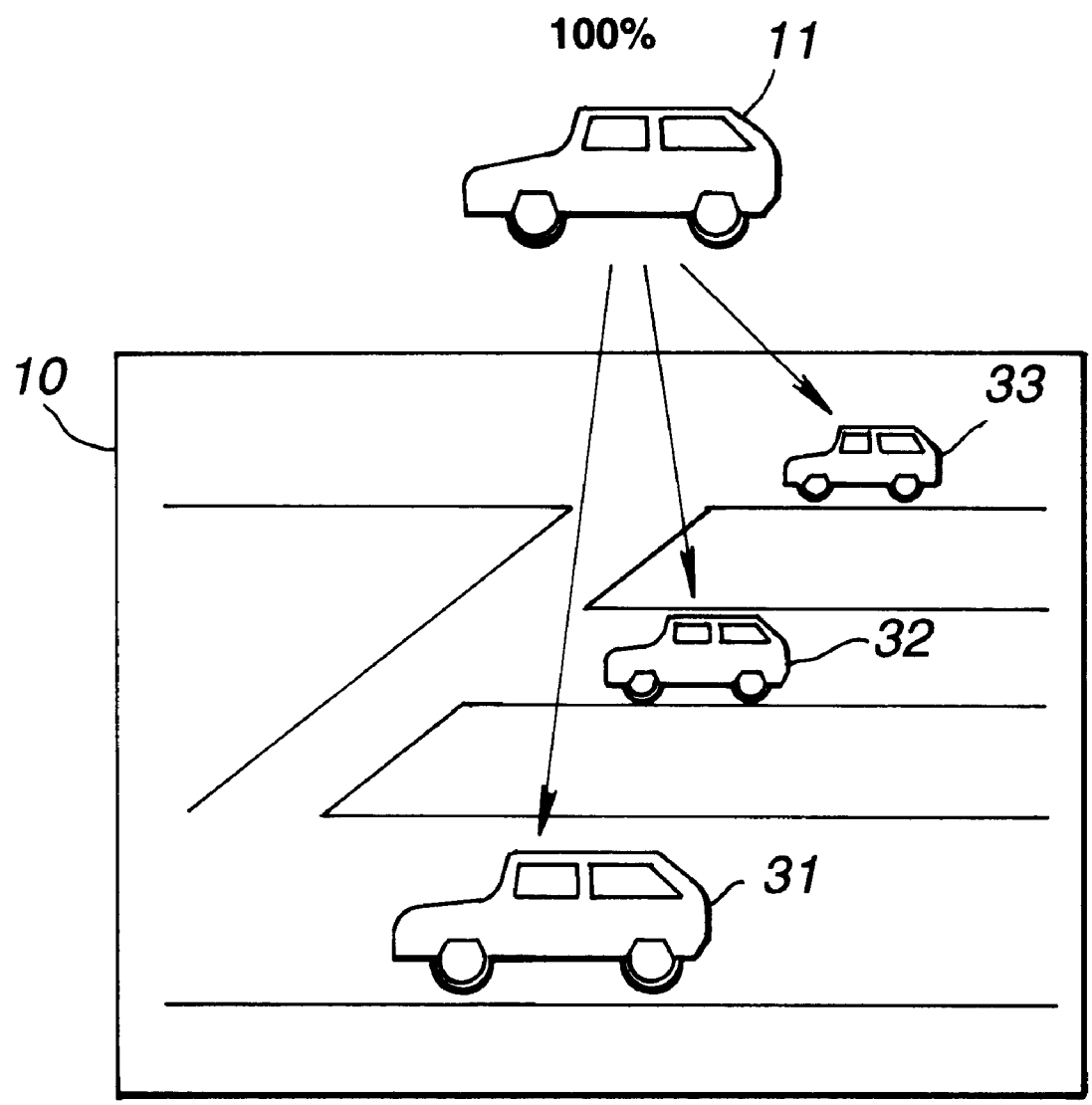
FIG. 2 illustrates an exemplary display according to a conventional technique.

A picture drawn by using a technique according to the embodiment of the present invention is shown in FIG. 1. A picture drawn by using a conventional technique is shown in FIG. 2. In the conventional technique, generally in CG drawing, models 31, 32 and 33 at their respective positions within a display screen 10 are drawn by constantly using the same model 11 as shown in FIG. 2, regardless of the position, size and depth of the model, the point of the viewer's attention, and the shifting speed of the model. However, the same model is not always required for drawing. By switching the model as shown in FIG. 1 in accordance with the position, size and depth of the model, the point of the viewer's attention, and the shifting speed of the model, and using more simplified models 12 and 13 as well as the original detailed model 11 to draw models 21, 22 and 23 within the screen, sufficient picture quality may be obtained.

In the embodiment of the present invention, in order to produce the approximated models 12 and 13 from which detailed portions of the original model 11 have been removed, as shown in FIG. 1, removal of normals allocated to the model and change of value thereof are carried out, thus preventing deterioration in quality after approximation.

Figure 3:
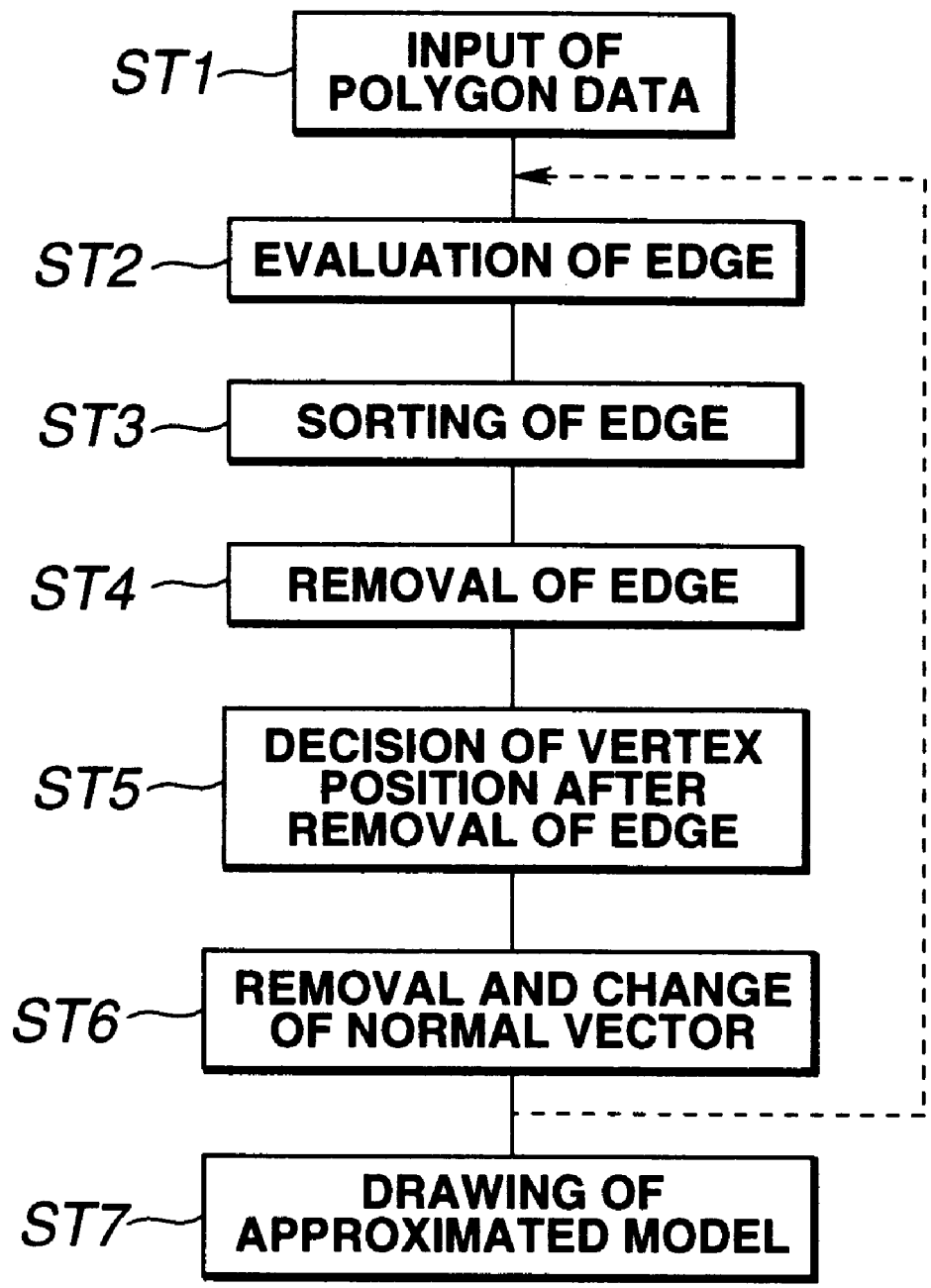
FIG. 3 is a flowchart for explaining the entire processing of the embodiment of the present invention.

FIG. 3 is a flowchart of hierarchical approximation of a polygon model with normal vectors according to the embodiment of the present invention. To perform approximation of the polygon model, an edge of the polygon is removed to approximate the shape. However, this removal of the edge alone results only in approximation of the polygon and will not achieve approximation of the normal vectors allocated to respective surfaces and vertices of the polygon. Therefore, optimization based on integration of the normal vectors and change of the normal vectors along with removal of the edge is required.

The outline of the entire approximation processing is first explained in accordance with the procedures of steps ST1 to ST7 of FIG. 3.

At step ST1, original polygon date is input. At step ST2, each edge is evaluated for performing removal of an edge. At step ST3, the evaluation values are sorted by magnitude and the edge having the minimum value is selected. At step ST4, the edge having the minimum evaluation value selected at step ST3 is removed. At step ST5, the position of vertices remaining after removal of the edge is decided. At step ST6, a normal vector which has become unnecessary on removal of the edge is removed and the remaining normal vectors are changed. At step ST7, an approximated model is drawn. The processing from steps ST2 to ST6 is repeatedly executed in accordance with desired precision.

The processing part relating to the model approximation is now explained. As described above, polygon approximation is performed by repeating edge removal. To select an edge suitable for removal, an evaluation function for evaluating how much the edge constituting the model contributed to the model shape is introduced. An example of this evaluation function F(e) is expressed by the following equation (1):

$$F(e) = \sum_i |aVi + bSi| \qquad (1)$$

Vi=(Ni.E)×Ai
Si=|E|×Ai
a, b: coefficients

Figure 4:
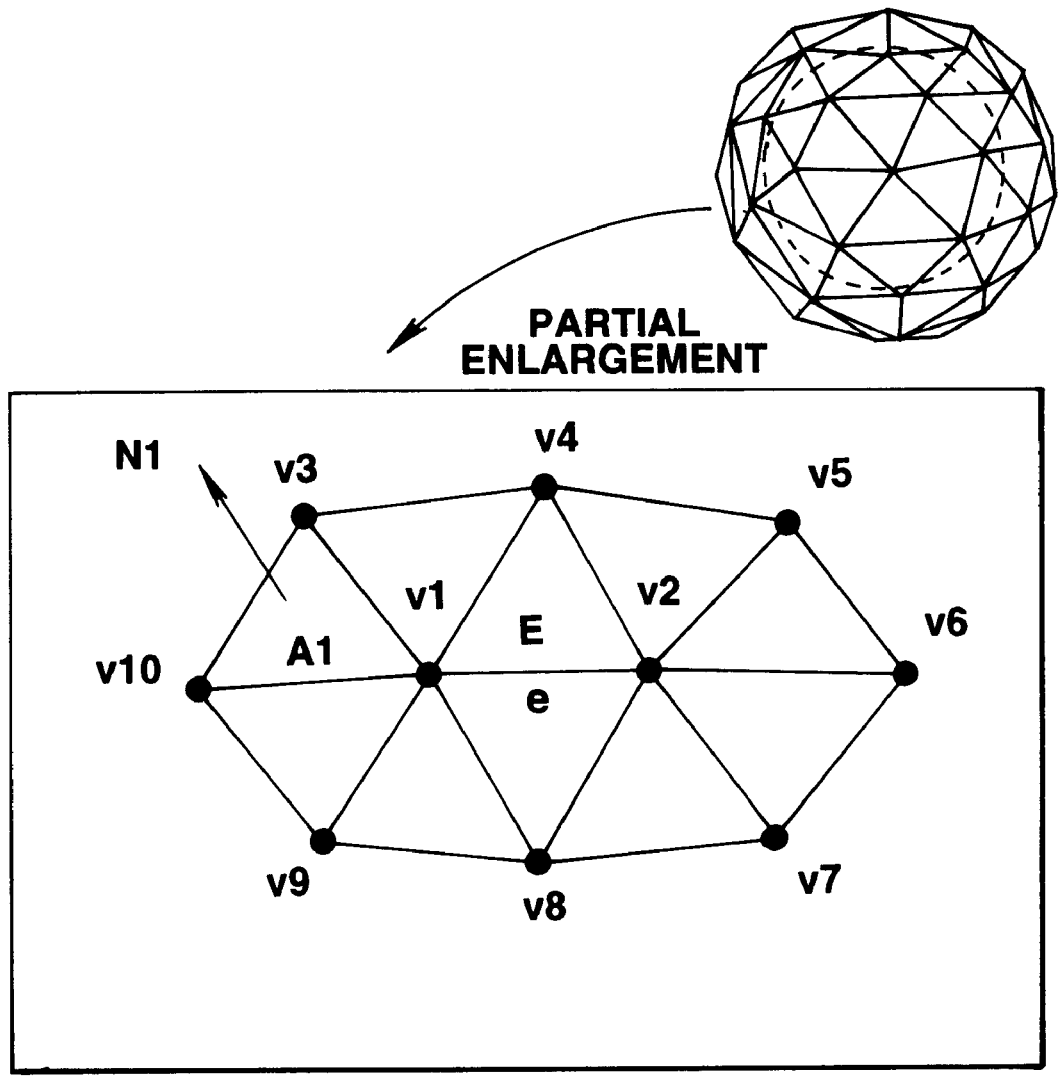
FIG. 4 illustrates edge evaluation in approximation.

The symbols E, Ni, Ai, and v1 to v10 in this equation (1) correspond to a vector E expressing an edge e of polygon data as shown in FIG. 4, a normal vector Ni, a surface Ai, and vertices v1 to v10, respectively. In FIG. 4, graphic data is partly enlarged for explaining the equation (1).

The evaluation function F(e) of the equation (1) evaluates the edge e constituted by two vertices v1 and v2. In this case, if sets of surfaces including these two vertices v1 and v2 constituting the edge e (v1, v2) as vertices are denoted by S(v1) and S(v2), respectively, the range of i is S(v1)∪S(v2). E expresses a vector having the direction and length of the edge e, Ni expresses a unit normal vector of each surface, Ai expresses the area of the surface, and |E| expresses the length of the vector E.

The evaluation function F(e) of the equation (1) includes two terms. The first term Vi expresses the volumetric quantity of change in the case where an edge as the evaluation target is removed. The second term Si expresses a value found by multiplying the area of the surfaces existing on both sides of the target edge by the length of the edge. This means the volumetric change of the surface including only the target edge. The two terms are multiplied by coefficients a and b, respectively. In accordance with which term is to be preferred, the user may select the magnitude of the coefficients. The first term Vi is largely dependent on the peripheral shape of the edge as the evaluation target. On the other hand, the second term Si is dependent on the length of the target edge and the area of the surfaces existing on both sides of the target edge. With a model having a flat shape, such as, a piece of paper, the quantity of change is greater for the term Si than for the term Vi. On the other hand, with a model including surfaces all of which have similar shape and area, the quantity of change is greater for the term Vi than for the term Si.

By calculating the value of the equation (1) with respect to each edge constituting the graphic model and then sorting the calculated values sequentially in accordance with magnitude to select the edge having the smallest evaluation value, this edge has the minimum contribution to the model shape at the time of removal of the edge. This approximation processing of the model shape corresponds to steps ST2 to ST4. By removing the edge from the model, the surface relating to the removal target edge and vertex constituting the edge are also removed. At this point, by adjusting the position of the vertices remaining after removal of the edge, the change in shape of the approximated model is reduced and the quality of the model may be improved. This processing corresponds to step ST5.

Figures 5A, 5B:
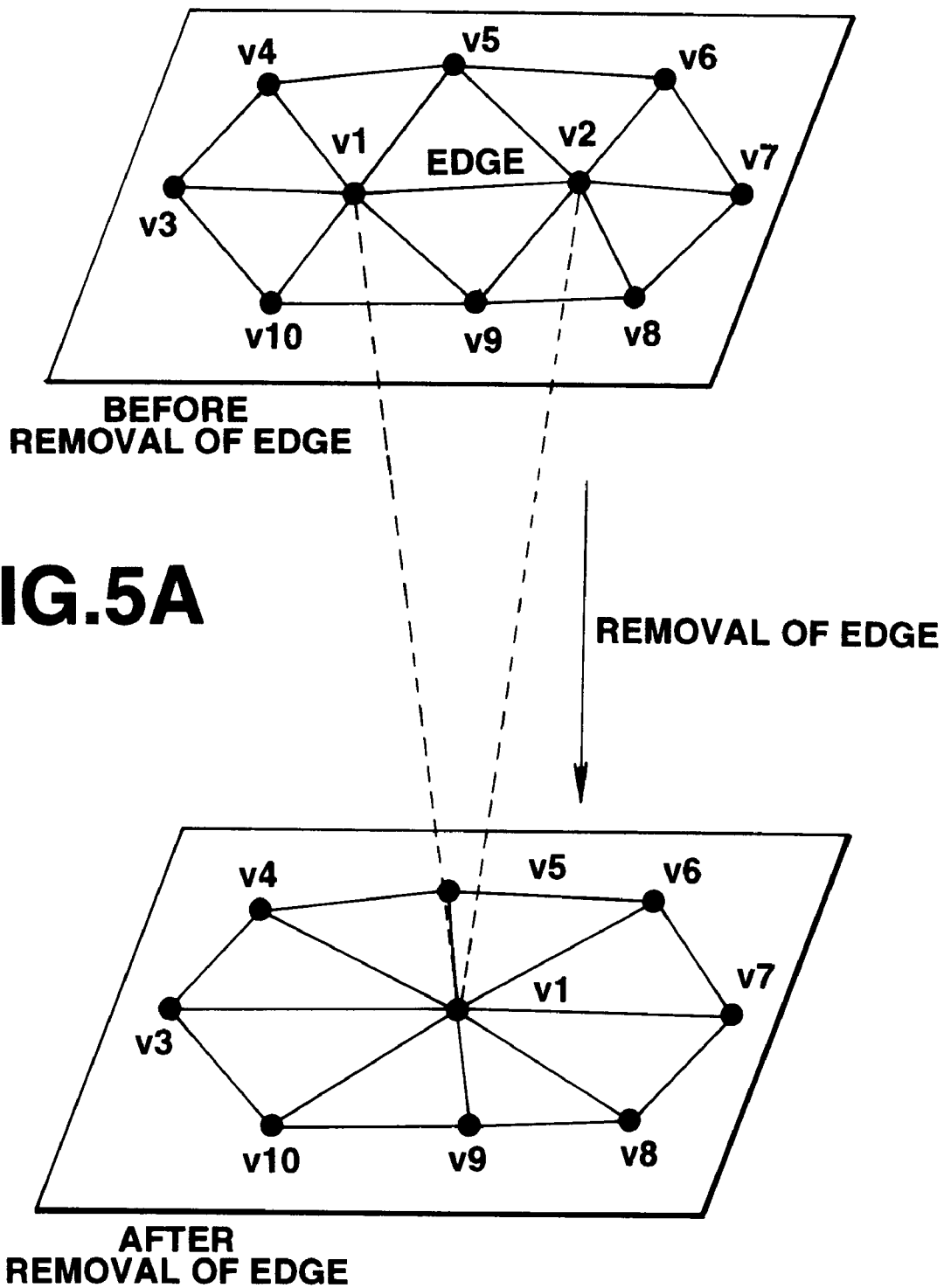
FIGS. 5A and 5B illustrate processing for removal of an edge.

FIGS. 5A and 5B show an example of removal of edge. FIG. 5A shows the case before removal of the edge while FIG. 5B shows the case after removal of the edge. In this example, an edge constituted by two vertices v1 and v2 is removed. On removal of the edge, the vertex v2 is also removed and the vertex v1 remains. Although there is a technique to leave the vertex v1 at the position prior to removal of the edge, the quality of the approximated model may be more improved by shifting the vertex to a position for minimizing the change in shape after removal of the edge or to a position at an arbitrary ratio on the removed edge. For example, a technique to locate the vertex at a position for minimizing the volumetric change may be employed.

In the example of FIG. 5, the quality of the approximated model is more improved by shifting v1 to an intermediate position between the vertices v1 and v2. Thus, at step ST5, the vertex position after removal of the edge is decided. In this decision of the vertex position, a distribution value (coefficient) indicating what distribution is taken between the two vertices constituting the removal target edge may be calculated and output. This processing is shown in FIGS. 6A to 6C.

In this case, an edge constituted by two vertices v2 and v3 is removed as shown in FIGS. 6A and 6B. After removal of the edge, the two vertices v2 and v3 are integrated into v2, which is referred to as v2'. The position of v2' is linearly interpolated between v2 and v3 with a distribution ratio of t:1−t as shown in FIG. 6C. With respect to this distribution ratio t, there is a technique for distribution in accordance with the magnitude of the edge evaluation value, a technique to locate v2' at an intermediate position on the edge by setting t to 0.5 as a fixed value, or a technique to locate v2' at a position of predetermined distribution on the edge by setting t to a fixed value other than 0.5. This distribution ratio t is used for changing the normal vector as later described.

Although linear interpolation between the two vertices v2 and v3 is explained here, it is also possible to locate v2' at a position outside of the edge as well as a position on the edge constituted by the two vertices or to locate v2' using secondary or higher-order interpolation other than linear interpolation.

The processing at step ST6 according to the embodiment of the present invention will be described in detail hereinafter.

Figure 7A:
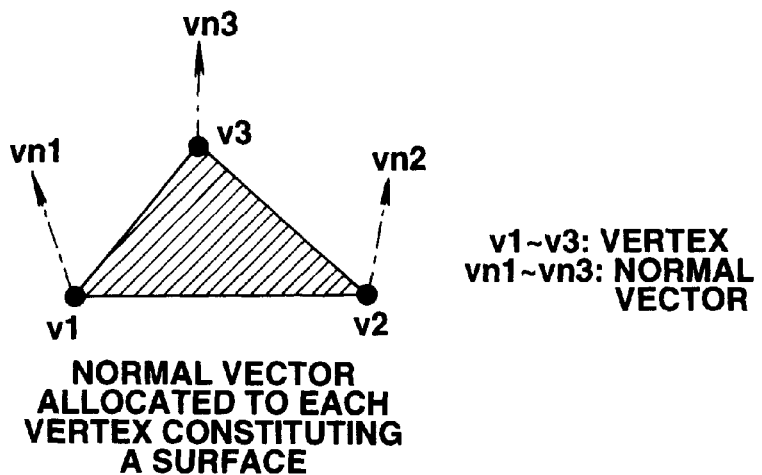
FIGS. 7A to 7C illustrate normal vectors allocated to vertices of a model.

The edge is removed at step ST5. However, in the model in which normal vectors are allocated, the normal vector is allocated to each vertex constituting a surface as shown in FIG. 7A. Although only one surface is shown in this figure, a similar normal may be allocated to the entire surfaces constituting the polygon model or to each vertex of a part thereof. In drawing the model by thus allocating the normal vectors, a smooth surface as a whole may be expressed without clarifying the junction of the surfaces. That is, it is possible to cause the surfaces to look continuous as if there were no clear boundary between the surfaces.

Figure 7B:
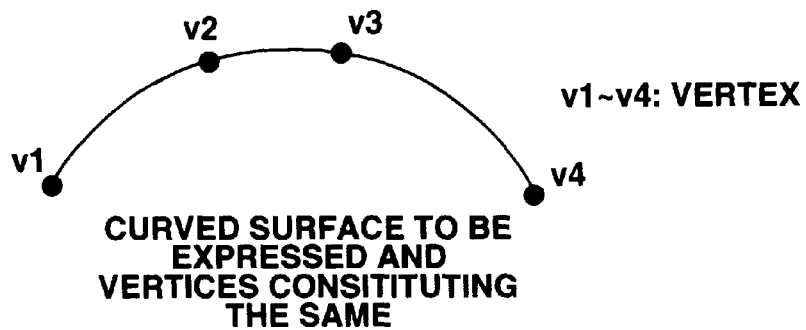
Figure 7C:
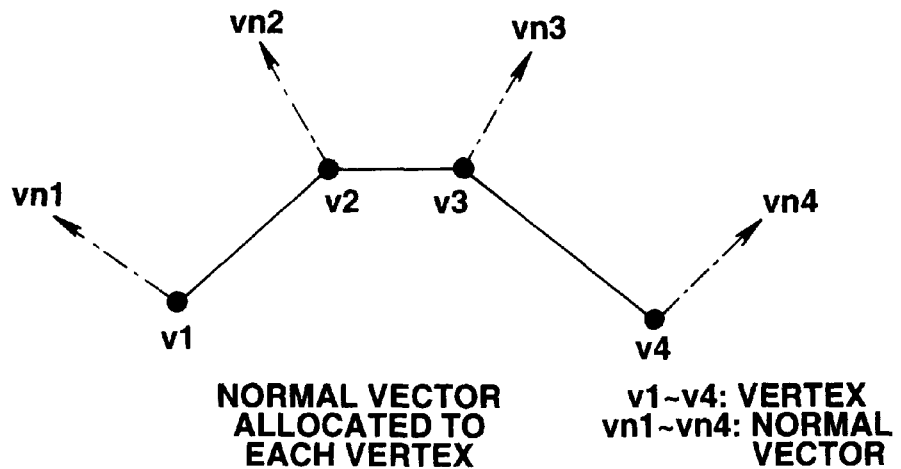

FIGS. 7B and 7C show a curved surface in two-dimensional views for simplifying the explanation. A curved surface which a producer wishes to express is shown by a line in FIG. 7B. In actual drawing of the curved surface using a polygon, the curved surface is expressed by connection of the surfaces. Therefore, the curved surface is expressed here by vertices v1 to v4 in FIG. 7B. Since each surface is flat as it is, normal vectors are allocated to the vertices as shown in FIG. 7C so that the surface is smoothly expressed in the drawing.

Figure 8A:
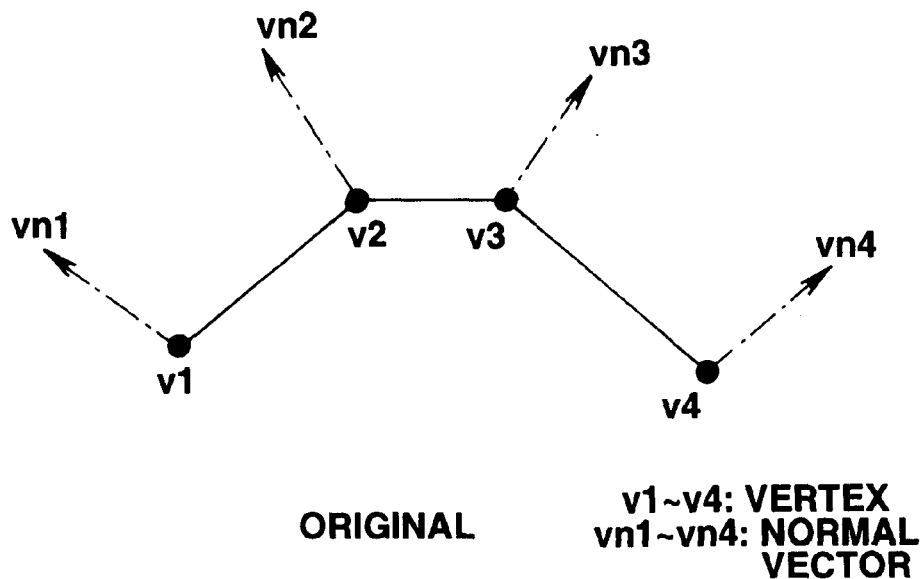
FIGS. 8A and 8B illustrate the case where the normal vector is not changed at the time of removal of the edge.
Figure 8B:
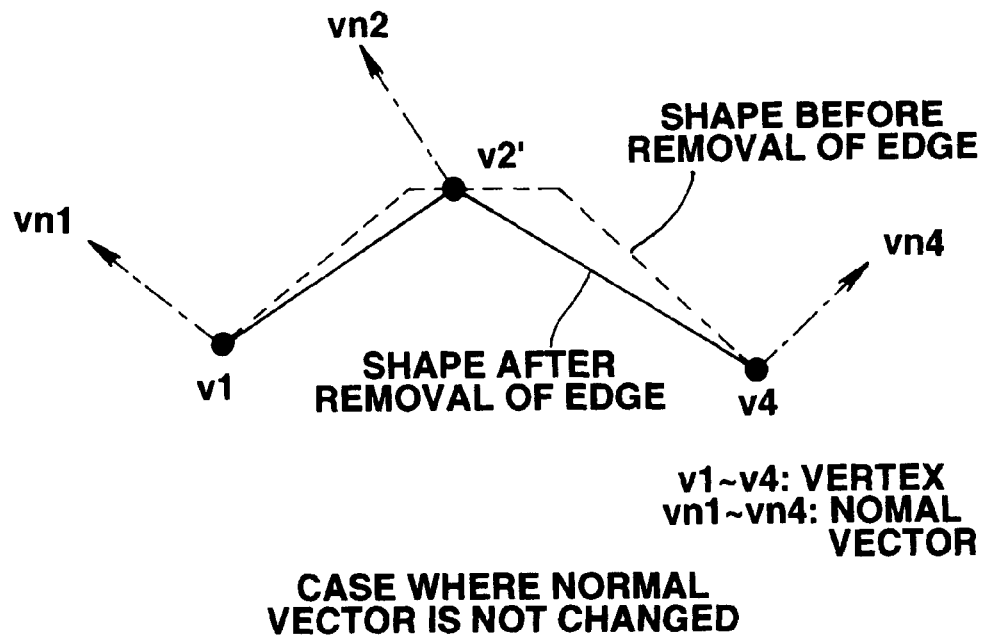

In FIG. 8A, one edge constituted by two vertices v2 and v3 is removed. In this case, the vertices v2 and v3 are aggregated to v2' and the position of v2' is arranged between the vertices v2 and v3. If the normal vector is not changed as shown in FIG. 8B, the normal vector allocated to v2' remains the same as the normal vector allocated to v2, and a smooth curved surface which the producer wishes to express by v1-v2'-v4 cannot be drawn.

Figure 9A:
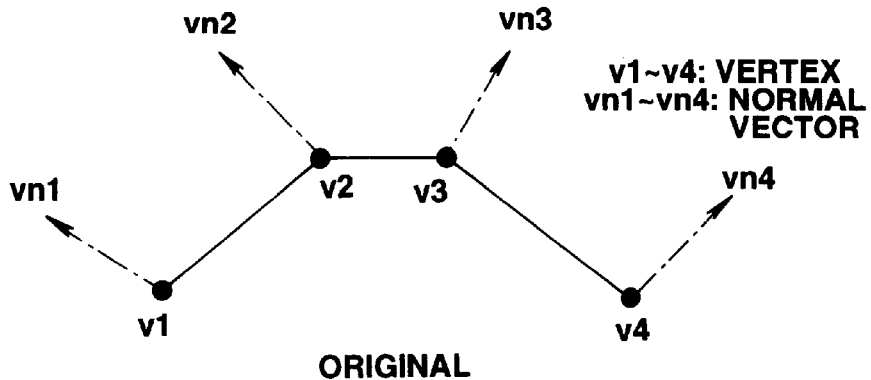
FIGS. 9A to 9C illustrate the case where the normal vector is changed at the time of removal of the edge.
Figure 9B:
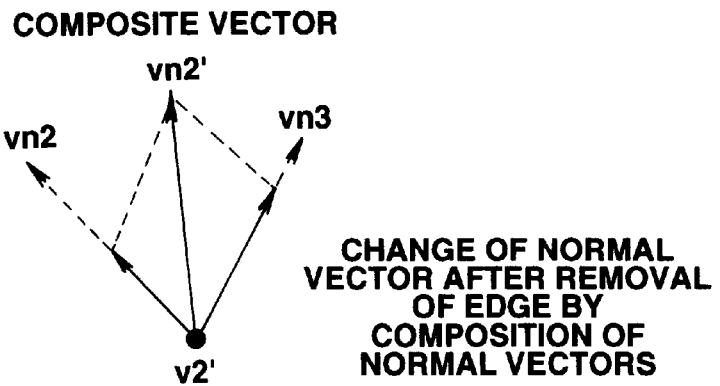
Figure 9C:
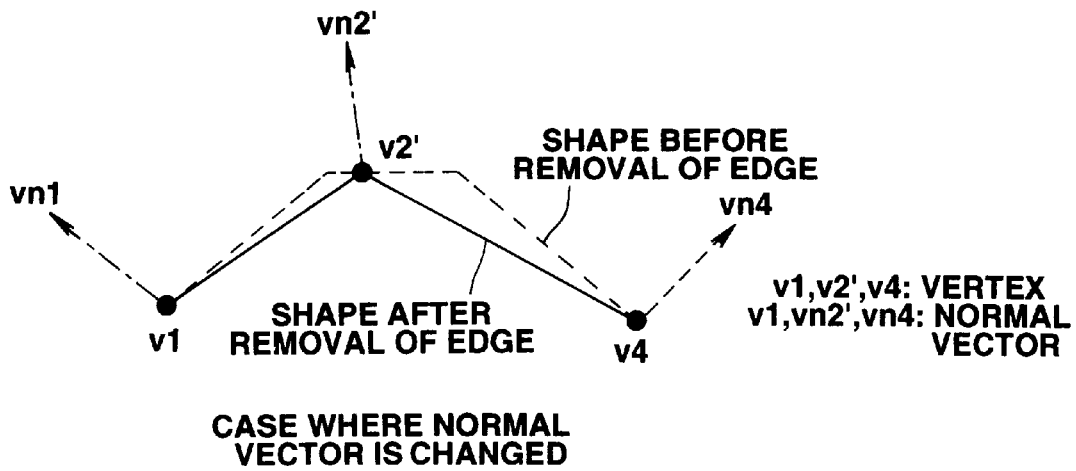

In order to prevent such phenomenon, the normals allocated to the two vertices v2 and v3 constituting the removal target edge must be removed and changed on removal and shift of the vertices, as shown in FIG. 9B. In the case where the position of the vertex v2' of v2 after removal of the edge is arranged by linear interpolation between v2 and v3 at the distribution ratio of t:1−t as described above, a composite vector of vn2 and vn3 is produced using this distribution ratio as shown in FIG. 9B, and the resulting composite vector becomes the normal vector of v2' as shown in FIG. 9C. FIG. 9A shows the original shape before the edge is removed, similarly to FIG. 8A.

In finding this composite vector, the magnitude of all the normal vectors may be made the same by normalizing the normal vectors to a certain magnitude. By thus calculating the composite vector, the normal vector is changed along with the shift of the vertex so that a surface proximate to the originally intended curved surface may be drawn.

There is also a technique of calculating the area of a surface which includes two vertices constituting the removal edge as both end vertices, at each vertex, then deciding the value of the normal in accordance with the area ratio, and performing normalization, without using the ratio t in the above-described vertex shift decision. In addition, there is also a technique of performing weighting on the composite normal vector in accordance with the reciprocal of the number of the edges to be connected to each of the two vertices constituting the removal target edge or the reciprocal of the length of the edge to be connected. On the other hand, there is a technique of leaving the normals in a state prior to approximation without integrating the normals as described above, so as to clarify the boundary between surfaces.

Figure 10A:
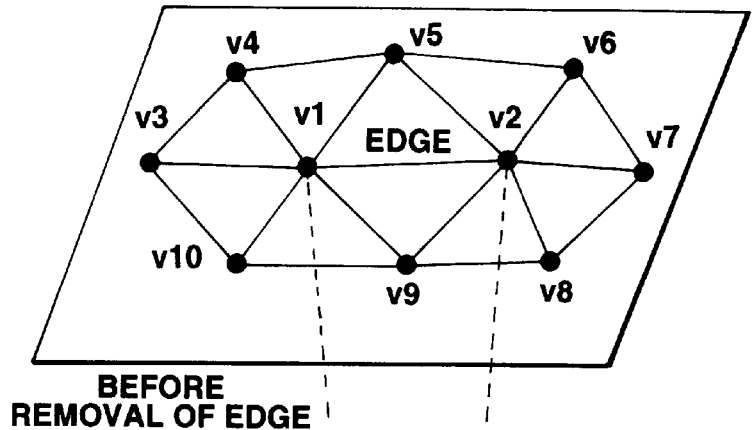
FIGS. 10A to 10C illustrate a method for obtaining a model of intermediate stage from the relation of corresponding vertices at the time of removal of the edge.
Figure 10B:
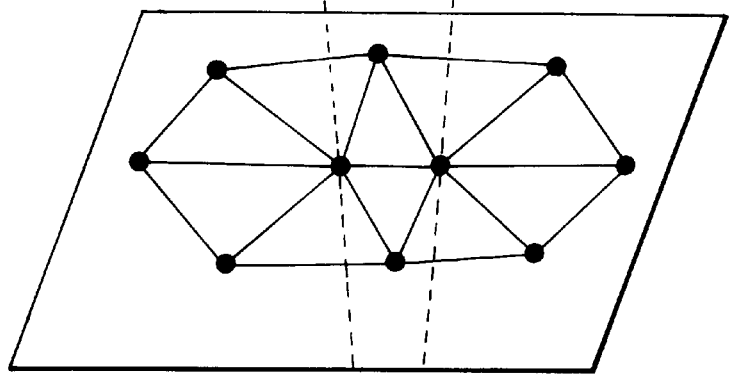
Figure 10C:
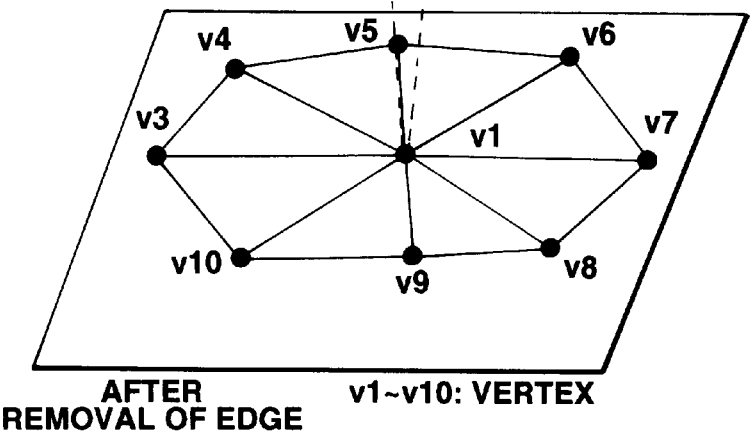

Since model approximation is realized by repeating removal of the edge, an intermediate model between two adjacent models may be obtained from the relation of vertex removal and aggregation, as shown in FIGS. 10A to 10C. By performing linear interpolation between two models before and after removal of the edge so as to decide the position of the vertex, a smooth transformation may be realized. FIG. 10A shows data before removal of the edge, FIG. 10B shows interpolated data between data before and after removal of the edge, and FIG. 10C shows data after removal of the edge.

Since a normal vector is allocated to each vertex, the normal vector in the interpolated model may also be obtained easily by applying coefficients found by interpolating the vertices to the normals, as in the case of the vertices.

Figure 11A:
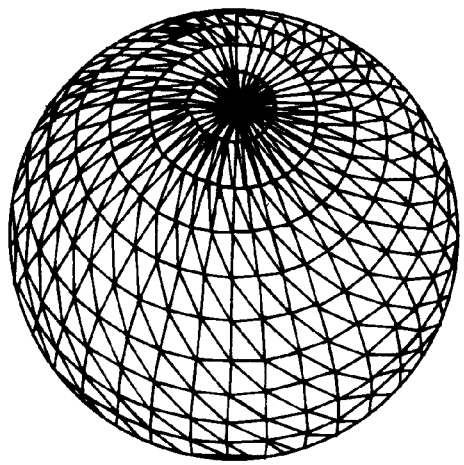
FIGS. 11A to 11D show wire frames of an example in which a model with a picture is approximated according to the embodiment of the present invention.
Figure 11B:
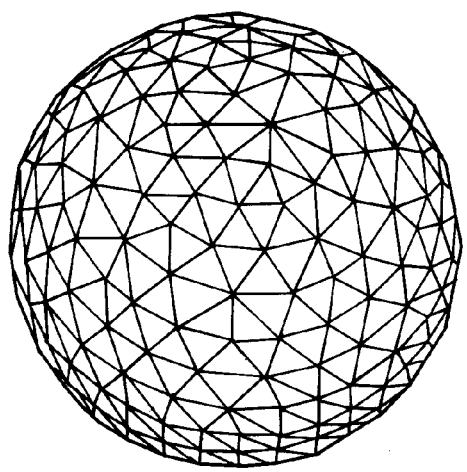
Figure 11C:
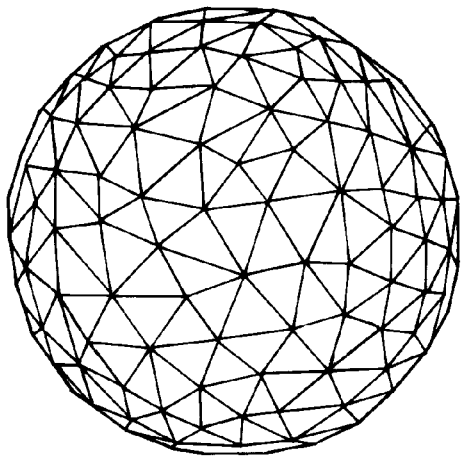
Figure 11D:
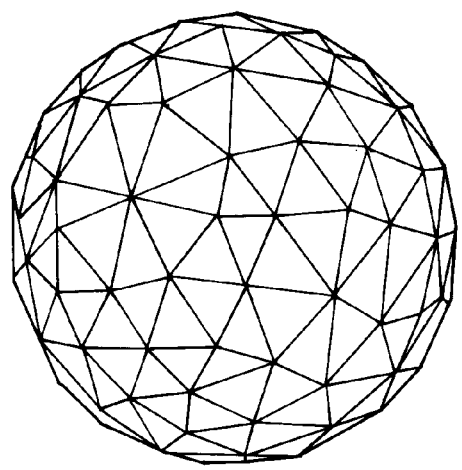

FIGS. 11A to 11D show wire frame states of processing results according to the present invention. In this case, an original model is a sphere constituted by 762 vertices, 1520 surfaces, and 762 normal vectors. In this example, the number of vertices of the original model shown in FIG. 11A is reduced by 60% each by the number of vertex comparison, so that approximation is performed as shown in FIGS. 11B to 11D. In such approximation, by performing approximation including normal vectors as described above so as to carry out smooth shading in displaying the approximated model, the entire model may be drawn without displaying a boundary between surfaces constituting the model. Thus, little distortion in shape due to approximation is generated and the model shape is maintained.

Figure 12:
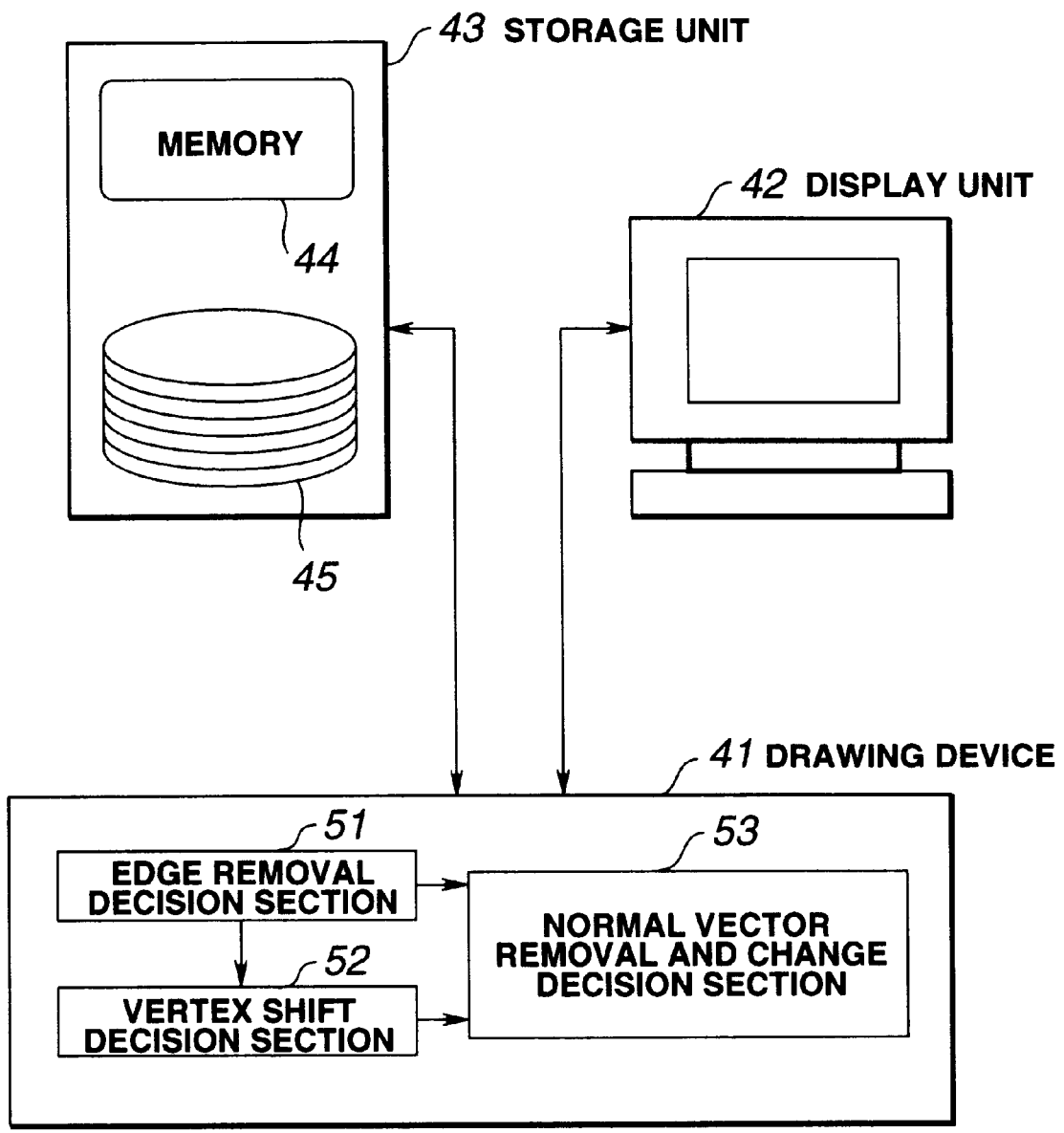
FIG. 12 is a block diagram showing a drawing system according to the embodiment of the present invention.

FIG. 12 shows an example of a drawing system according to an embodiment of the present invention. In FIG. 12, a drawing device 41 is connected with a display unit 42, such as, a cathode ray tube (CRT) display, and with a storage unit 43. The storage unit 43 includes a memory 44 and a hard disk unit 45. A hierarchically approximated model which is obtained in advance is set on the storage unit 43 of FIG. 12, and the model is appropriately switched and displayed in accordance with information, such as, the apparent size, speed and display position of the model on the screen and the point of the viewer's attention. In the storage unit 43, data of the model may be set on the electronic memory 44 or stored in a medium, such as, the hard disk unit 45. The storage method may be selected in response to the user's demand. The approximated model for drawing may be obtained not only by preparation in advance but also by real-time approximation at the time of drawing.

The drawing device 41 of FIG. 12 includes an edge removal decision section 51, a vertex shift decision section 52, and a normal vector removal and change decision section 53, as constituent parts according to the embodiment of the present invention. Specifically, the drawing device 41 includes the edge removal decision section 51 for deciding which edge of shape data should be removed in approximating the shape data with normal vectors appended thereto to desired resolution. The drawing device 41 also includes the vertex shift decision section 52 for deciding a new vertex position in the shape data after removal of the edge. The drawing device 41 also includes the normal vector removal and change decision section 53 for removing an unnecessary normal vector and changing the normal vector value in conformity with the new vertex position in the shape data, with respect to the normal vectors allocated to the shape data, in accordance with outputs from the edge removal decision section 51 and the vertex shift decision section 52. Although these sections may be constituted by hardware, they are more often realized as functional blocks of software.

With such structure, removal of the edge in model approximation is decided by the edge removal decision section 51, and the amount of shift of vertices remaining after removal of the edge is decided by the vertex shift decision section 52. In accordance with the outputs from the edge removal decision section 51 and the vertex shift decision section 52, removal and shift of the normal vectors allocated to the model surface are decided by the normal vector removal and shift decision section 53. Thus, removal of the normal vector or change of value thereof according to the decision is carried out. By these procedures, distortion of the normal vector in model approximation is restrained so that approximation of a model including a picture is enabled.

As described above, in the case where normal vectors are allocated to graphic data used for CG according to the present invention, approximation to a desired degree of detail is enabled while distortion of the normal vector or deterioration in apparent quality is prevented. By using graphic data obtained by the present invention, high-speed drawing and high-quality drawing may be realized.

According to the present invention, in approximating shape data with normal vectors appended thereto to desired resolution, which edge of the shape data to be removed is decided and a new vertex position in the shape data after removal of the edge is decided. In response to an output obtained from the edge removal decision and the vertex shift decision, normal vector values are changed in conformity with removal of an unnecessary normal and the new vertex positions of the shape data, with respect to the normal vectors allocated to the respective surfaces of the shape data. Thus, the shape data of a geometric model used for CG may be approximated in a state that the normal vectors are appended. Also, in addition to achievement of approximation, distortion of the normal vectors in the approximation result may be restrained. By using the model thus approximated, requirements of high speed and high picture quality may be satisfied in CG drawing.

What is claimed is:

1. A shape data approximation method for approximating shape data with normal vectors appended thereto to desired resolution, the method comprising:

an edge removal selection step for selecting an edge of the shape data to be removed at the time of approximation;

a vertex position decision step for deciding a new vertex position in the shape data after removal of the edge selected in the edge removal selection step; and a normal vector decision step for removing at least one unnecessary normal vector and deciding a value of a new normal vector for the new vertex position in the shape data based on a new shape determined based on results of the edge removal selection step and the new vertex position decided in the vertex position decision step.

2. The shape data approximation method as claimed in claim 1, wherein said normal vector decision step includes removing the normal vector corresponding to at least one vertex of said edge selected in said edge removal selection step.

3. The shape data approximation method as claimed in claim 1, wherein said normal vector decision step includes finding the value of the normal vector by interpolation from values of the normal vectors corresponding to vertices of the selected edge.

4. The shape data approximation method as claimed in claim 3, wherein the interpolation of the normal vector decided in said normal vector decision step is performed by using linear interpolation.

5. The shape data approximation method as claimed in claim 1, wherein said removing and deciding steps of said normal vector decision step occur after approximation in accordance with the vertex position decision step.

6. The shape data approximation method as claimed in claim 5, wherein the new vertex position (v') decided in the vertex position decision step is found by calculation of (v)'=t×v1+(1−t)v2 by interpolation between two vertices (v1, v2) of the selected edge, and a normal vector (vn') associated with the new vertex is found by calculation of (v)'=t×v1+(1−t)v2 from normal vectors (vn1, vn2) associated with the two vertices of the selected edge, using the same interpolation coefficient t.

7. The shape data approximation method as claimed in claim 1, wherein said normal vector decision step includes normalizing the normal vectors in finding the normal vector associated with the new vertex.

8. The shape data approximation method as claimed in claim 1, wherein said deciding step of said normal vector decision step is associated with the removed vertex and is not used by other vertices.

9. The shape data approximation method as claimed in claim 1, wherein said normal vector decision step includes weighting a normal vector associated with the new vertex after removal of the selected edge, in accordance with the area of surfaces including at least one of the vertices of the selected edge.

10. The shape data approximation method as claimed in claim 1, wherein said normal vector decision step includes weighting a normal vector associated with the new vertex after removal of the selected edge, in accordance with the number of connections derived from two vertices of the selected edge.

11. The shape data approximation method as claimed in claim 1, wherein said normal vector decision step includes setting the value of a normal vector associated with the new vertex after removal of the selected edge to the same level as a normal vector corresponding to one of the vertices of the selected edge.

12. A drawing device for approximating shape data with normal vectors appended thereto to desired resolution, the device comprising:

an edge removal selection section for selecting an edge of the shape data to be removed at the time of approximation;

a vertex position decision section for deciding a new vertex position in the shape data after removal of the edge selected by the edge removal selection section; and a normal vector decision section for removing at least one unnecessary normal vector and deciding a value of a new normal vector for the new vertex position in the shape data based on a new shape determined based on results of the edge removal selection step and the new vertex position decided in the vertex position decision step.

13. The drawing device as claimed in claim 12, said normal vector decision section for removing the normal vector corresponding to at least one of the vertices of said edge selected in said edge removal selection step.

14. The drawing device as claimed in claim 12, said normal vector decision section for finding the value of the normal vector by interpolation from values of the normal vectors corresponding to vertices of the selected edge.

15. The drawing device as claimed in claim 14, wherein the interpolation of the normal vector decided by said normal vector decision section is performed by using linear interpolation.

16. The drawing device as claimed in claim 12, wherein the removing and deciding performed by said normal vector decision section occur after approximation in accordance with the output from the vertex position decision section.

17. The drawing device as claimed in claim 16, wherein the new vertex position (v') decided by the vertex shift decision section is found by calculation of $(v)'=t\times v1+(1-t)v2$ by interpolation between two vertices (v1, v2) of the selected edge, and a normal vector (vn') associated with the new vertex is found by calculation of $vn'=t\times vn1+(1-t)vn2$ from normal vectors (vn1, vn2) associated with the two vertices of the selected edge, using the same interpolation coefficient t.

18. The drawing device as claimed in claim 12, said normal vector decision section for normalizing the normal vectors in finding the normal vector associated with the new vertex.

19. The drawing device as claimed in claim 12, wherein the decision of said normal vector decision section is associated with the removed vertex and is not used by other vertices.

20. The drawing device as claimed in claim 12, said normal vector decision section for weighting a normal vector associated with the new vertex after removal of the selected edge, in accordance with the area of surfaces including at least one of the vertices of the selected edge.

21. The drawing device as claimed in claim 12, said normal vector decision section for weighting a normal vector associated with the new vertex after removal of the selected edge, in accordance with the number of connections derived from two vertices of the selected edge.

22. The drawing device as claimed in claim 12, said normal vector decision section for setting the value of a normal vector associated with the new vertex after removal of the selected edge to the same level as a normal vector corresponding to one of the vertices of the selected edge.

23. The shape data approximation method as claimed in claim 1, wherein said normal vector decision step includes weighting a normal vector associated with the new vertex after removal of the selected edge, in accordance with distances of other edges derived from two vertices of the selected edge.

24. The shape data approximation method as claimed in claim 1, wherein said edge removal selection step includes selecting said edge based on change of volume when said selected edge as evaluation target is removed.

25. The shape data approximation method as claimed in claim 1, wherein said edge removal selection step includes selecting said edge based on volumetric change of surface including only said selected edge when said selected edge as evaluation target is removed.

26. The shape data approximation method as claimed in claim 1, said normal vector decision step including the steps of:

removing the normal vector corresponding to at least one of the vertices of said edge selected in said edge removal selection step; and deciding new values of the normal vectors corresponding to the new vertex position in the shape data decided in said vertex position decision step.

27. The shape data approximation method as claimed in claim 1, said vertex position decision step including the step of setting the new vertex position at one of the vertices of the selected edge.

28. The shape data approximation method as claimed in claim 6, said vertex position decision step further including the step of setting the interpolation coefficient t at a fixed value.

29. The shape data approximation method as claimed in claim 6, said vertex position decision step further including the step of setting the interpolation coefficient t at approximately 0.5.

30. The shape data approximation method as claimed in claim 9, wherein coefficients for the weighting are based on the reciprocal of the number of other edges to be connected to each of the vertices of the selected edge.

31. The shape data approximation method as claimed in claim 10, wherein coefficients for the weighting are based on the reciprocal of the lengths of other edges to be connected to each of the vertices of the selected edge.

32. The shape data approximation method as claimed in claim 1, wherein said vertex position decision step includes finding the value of the new vertex position by interpolation from values of the vertices of the selected edge.

33. The shape data approximation method as claimed in claim 32, wherein said normal vector decision step includes finding the value of the new normal vector by interpolation from values of the normal vectors corresponding to vertices of the selected edge.

34. The drawing device as claimed in claim 12, said normal vector decision section for weighting a normal vector associated with the new vertex after removal of the selected edge, in accordance with distances of other edges derived from two vertices of the selected edge.

35. The drawing device as claimed in claim 12, said edge removal selection section for selecting said edge based on change of volume when said selected edge as evaluation target is removed.

36. The drawing device as claimed in claim 12, said edge removal selection section for selecting said edge based on volumetric change of surface including only said selected edge when said selected edge as evaluation target is removed.

37. The drawing device as claimed in claim 12, said normal vector decision section for:

removing the normal vector corresponding to at least one of the vertices of said edge selected in said edge removal selection step; and deciding new values of the normal vectors corresponding to the new vertex position in the shape data decided in said vertex position decision step.

38. The drawing device as claimed in claim 12, said vertex position decision section for setting the new vertex position at one of the vertices of the selected edge.

39. The drawing device as claimed in claim 17, said vertex position decision section for setting the interpolation coefficient t at a fixed value.

40. The drawing device as claimed in claim 17, said vertex position decision step further including the step of setting the interpolation coefficient t at approximately 0.5.

41. The drawing device as claimed in claim 20, wherein coefficients for the weighting are based on the reciprocal of the number of other edges to be connected to each of the vertices of the selected edge.

42. The drawing device as claimed in claim 21, wherein coefficients for the weighting are based on the reciprocal of the lengths of other edges to be connected to each of the vertices of the selected edge.

43. The drawing device as claimed in claim 12, said vertex position decision section for finding the value of the new vertex position by interpolation from values of the vertices of the selected edge.

44. The shape data approximation method as claimed in claim 43, said normal vector decision section for finding the value of the new normal vector by interpolation from values of the normal vectors corresponding to vertices of the selected edge.

45. The shape data approximation method as claimed in claim 1, wherein said edge removal selection step includes selecting said edge based on volumetric change of surface including only said selected edge when said selected edge as evaluation target is removed, and wherein said normal vector decision step including the steps of:

removing the normal vector corresponding to at least one of the vertices of said edge selected in said edge removal selection step; and deciding new values of the normal vectors corresponding to the new vertex positon in the shape data decided in said vertex position decision step.

46. The device as claimed in claim 12, said edge removal selection section for selecting said edge based on volumetric change of surface including only said selected edge when said selected edge as evaluation target is removed, and said normal vector decision section for:

removing the normal vector corerspponding to at least one of the vertices of said edge selected in said edge removal selection step; and deciding new values of the normal vectors corresponding to the new vertex position in the shape data decided in said vertex position decision step.

47. A program storage device readable by a machine, tangibly embodying a program of instructions executable by the machine to perform method steps for approximating shape data with normal vectors appended thereto to desired resolution, the method comprising the steps of:

an edge removal selection step for selecting an edge of the shape data to be removed at the time of approximation;

a vertex position decision step for deciding a new vertex position in the shape data after removal of the edge selected in the edge removal selection step; and a normal vector decision steps for removing at least one unnecessary normal vector and deciding a value of a new normal vector for the new vertex position in the shape data based on a new shape determined based on results of the edge removal selection step and the vertex position decision step.

48. The device of claim 47, wherein said normal vector decision step includes removing the normal vector corresponding to at least one vertex of said edge selected in said edge removal selection step.

49. The device of claim 47, wherein said normal vector decision step includes finding the value of the normal vector by interpolation from values of the normal vectors corresponding to vertices of the selected edge.

50. The device of claim 49, wherein the interpolation of the normal vector decided in said normal vector decision step is performed by using linear interpolation.

51. The device of claim 47, wherein said removing and deciding steps of said normal vector decision step occur after approximation in accordance with the vertex position decision step.

52. The device of claim 51, wherein the new vertex position (v') decided in the vertex position decision step is found by calculation of $(v')=t \times v1+(1-t)v2$ by interpolation between two vertices (v1, v2) of the selected edge, and a normal vector (vn') associated with the new vertex is found by calculation of $(v')=t \times v1+(1-t)v2$ from normal vectors (vn1, vn2) associated with the two vertices of the selected edge, using the same interpolation coefficient t.

53. The device of claim 47, wherein said normal vector decision step includes normalizing the normal vectors in finding the normal vector associated with the new vertex.

54. The device of claim 47, wherein said deciding step of said normal vector decision step is associated with the removed vertex and is not used by other vertices.

55. The device of claim 47, wherein said normal vector decision step includes weighting a normal vector associated with the new vertex after removal of the selected edge, in accordance with the area of surfaces including at least one of the vertices of the selected edge.

56. The device of claim 47, wherein said normal vector decision step includes weighting a normal vector associated with the new vertex after removal of the selected edge, in accordance with the number of connections derived from two vertices of the selected edge.

57. The device of claim 48, wherein said normal vector decision step includes setting the value of a normal vector associated with the new vertex after removal of the selected edge to the same level as a normal vector corresponding to one of the vertices of the selected edge.

58. The device of claim 48, wherein said normal vector decision step includes weighting a normal vector associated with the new vertex after removal of the selected edge, in accordance with distances of other edges derived from two vertices of the selected edge.

59. The device of claim 48, wherein said edge removal selection step includes selecting said edge based on change of volume when said selected edge as evaluation target is removed.

60. The device of claim 48, wherein said edge removal selection step includes selecting said edge based on volumetric change of surface including only said selected edge when said selected edge as evaluation target is removed.

61. The device of claim 48, said normal vector decision step including the steps of:

removing the normal vector corresponding to at least one of the vertices of said edge selected in said edge removal selection step; and deciding new values of the normal vectors corresponding to the new vertex position in the shape data decided in said vertex position decision step.

62. The device of claim 47, said vertex position decision step include the step of setting the new vertex position at one of the vertices of the selected edge.

63. The device of claim 52, said vertex position decision step further including the step of setting hte interpolation coefficient t at a fixed value.

64. The device of claim 52, said vertex position decision step further including the step of setting the interpolation coefficient t at approximately 0.5.

65. The device of claim 55, wherein coefficients for the weighting are based on the reciprocal of the number of other edges to be connected to each of the vertices of the selected edge.

66. The device of claim 56, wherein coefficients for the weithting are based on the reciprocal of the lengths of other edges to be connected to each of the vertices of the selected edge.

67. The device of claim 47, wherein said vertex position decision step includes finding the value of the new vertex position by interpolation from values of the vertices of the selected edge.

68. The device of claim 67, wherein said normal vector decision step includes finding the value of the new normal vector by interpolation from values of the normal vectors corresponding to vertices of the selected edge.

69. The device of claim 47, wherein said edge removal selection step includes selecting said edge based on volumetric change of surface including only said selected edge when said selected edge as evaluation target is removed, and wherein said normal vector decision step includes the steps of:

removing the normal vector corresponding to at least one of the vertices of said edge selected in said edge removal selection step; and decision new values of the normal vectors corresponding to the new vertex position in the shape data decided in said vertex position decision step.

70. A recording medium having a digital signal recorded thereon, said recording medium being prepared by the steps of:

selecting an edge of shape data to be removed at a time of approximation;

deciding a new vertex position in the shape data after removal of the edge selected in the edge removal selection step;

removing at least one unnecessary normal vector and deciding a value of a new normal vector for the new vertex position in the shape data based on a new shape determined based on results of the edge removal selection step and the vertex position decision step;

generating recording data corresponding to the shape data based on the new shape; and recording the generated recording data on the recording medium.

71. The medium of claim 70, wherein said normal vector decision step includes removing the normal vector corresponding to at least one vertex of said edge selected in said edge removal selection step.

72. The medium of claim 70, wherein said normal vector decision step includes finding the value of the normal vector by interpolation from values of the normal vectors corresponding to vertices of the selected edge.

73. The medium of claim 72, wherein the interpolation of the normal vector decided in said normal vector decision step is performed by using linear interpolation.

74. The medium of claim 70, wherein said removing and deciding steps of said normal vector decision step occur after approximation in accordance with the vertex position decision step.

75. The medium of claim 74, wherein the new vertex position (v') decided in the vertex position decision step is found by calculation of $(v)'=t\cdot v1+(1-t)v2$ by interpolation between two vertices (v1, v2) of the selected edge, and a normal vector (vn') associated with the new vertex is found by calculation of $(v)'=t\cdot v1+(1-t)v2$ from normal vectors (vn1, vn2) associated with the two vertices of the selected edge, using the same interpolation coefficient t.

76. The medium of claim 70, wherein said normal vector decision step includes normalizing the normal vectors in finding the normal vector associated with the new vertex.

77. The medium of claim 70, wherein said deciding step of said normal vector decision step is associated with the removal vertex and is not used by other vertices.

78. The medium of claim 70, wherein said normal vector decision step includes weighting a normal vector associated with the new vertex after removal of the selected edge, in accordance with the area of surfaces including at least one of the vertices of the selected edge.

79. The medium of claim 70, wherein said normal vector decision step includes weighting a normal vector associated with the new vertex after removal of the selected edge, in accordance with the area of surfaces including at least one of the vertices of the selected edge.

80. The medium of claim 70, wherein said normal vector decision step includes setting the value of the normal vector associated with the new vertex after removal of the selected edge to the same level as a normal vector corresponding to one of the vertices of the selected edge.

81. The medium of claim 70, wherein said normal vector decision step includes weighting a normal vector associated with the new vertex after removal of the selected edge, in accordance with distances of other edges derived from two vertices of the selected edge.

82. The medium of claim 70, wherein said edge removal selection step includes selecting said edge based on change of volume when said selected edge as evaluation target is removed.

83. The medium of claim 70, wherein said edge removal selection step includes selecting said edge based on volumetric change of surface including only said selected edge when said selected edge as evaluation target is removed.

84. The medium of claim 70, said normal vector decision step including the steps of:

removing the normal vector corresponding to at least one of the vertices of said edge selected in said edge removal selection step; and deciding new values of the normal vectors corresponding to the new vertex position in the shape data decided in said vertex position decision step.

85. The medium of claim 70, said vertex position decision step including the step of setting the new vertex position at one of the vertices of the selected edge.

86. The medium of claim 75, said vertex position decision step further including the step of setting the interpolation coefficient at a fixed value.

87. The medium of claim 75, said vertex position decision step further including the step of setting the interpolation coefficient t at approximately 0.5.

88. The medium of claim 78, wherein coefficients for the weighting are based on the reciprocal of the number of other edges to be connected to each of the vertices of the selected edge.

89. The medium of claim 79, wherein the coefficients for the weighting are based on the reciprocal of the lengths of other edges to be connected to each of the vertices of the selected edge.

90. The medium of claim 70, wherein said vertex position decision step includes finding the value of the new vertex position by interpolation from values of the vertices of the selected edge.

91. The medium of claim 90, wherein said normal vector decision step includes finding the value of the new normal vector by interpolation from values of the normal vectors corresponding to vertices of the selected edge.

92. The medium of claim 70, wherein said edge removal selection step includes selecting said edge based on volumetric change of surface including only said selected edge when said selected edge as evaluation target is removed, and wherein said normal vector decision step includes the steps of:

removing the normal vector corresponding to at least one of the vertices of said edge selected in said edge removal selection step; and deciding new values of the normal vectors corresponding to the new vertex position in the shape data decided in said vertex position decision step.

* * * * *